March 25, 1947.   B. S. GARVEY   2,418,025
COMPOSITE PRODUCT AND METHOD OF MAKING THE SAME
Filed Aug. 20, 1942

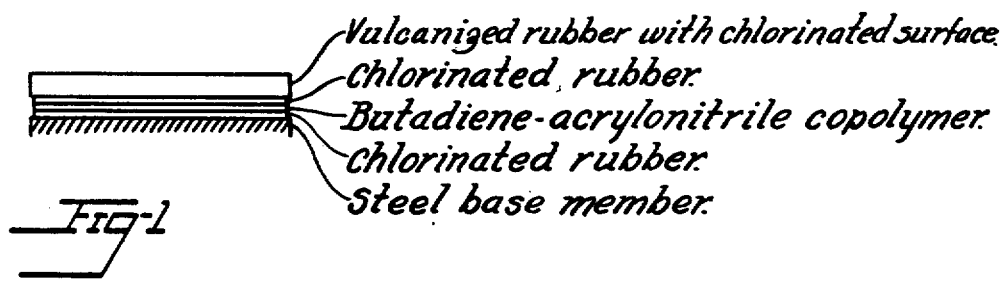

Fig-1

Vulcanized rubber with chlorinated surface.
Chlorinated rubber.
Butadiene-acrylonitrile copolymer.
Chlorinated rubber.
Steel base member.

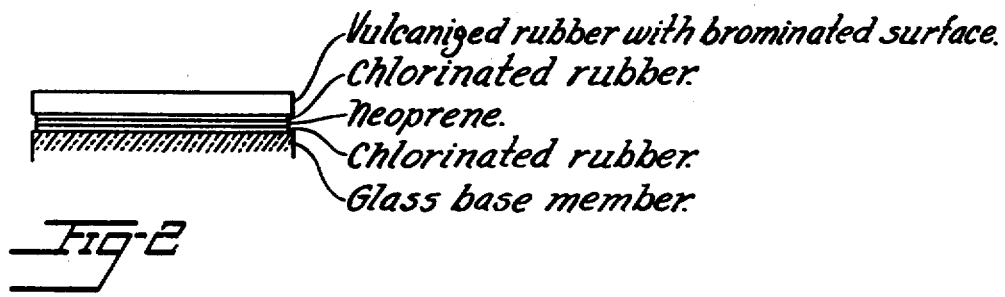

Fig-2

Vulcanized rubber with brominated surface.
Chlorinated rubber.
Neoprene.
Chlorinated rubber.
Glass base member.

Inventor
Benjamin S. Garvey
By Willis F. Avery
Atty.

Patented Mar. 25, 1947

2,418,025

UNITED STATES PATENT OFFICE 2,418,025

COMPOSITE PRODUCT AND METHOD OF MAKING THE SAME

Benjamin S. Garvey, Akron, Ohio, assignor to The B. F. Goodrich Company, New York, N. Y., a corporation of New York Application August 20, 1942, Serial No. 455,519

14 Claims. (Cl. 154—130)

This invention relates to a method of adhering previously vulcanized rubber to any of a variety of base members, and to the composite products that are so produced.

In commercial practice it is often necessary to adhere rubber to any of a variety of base members including metal, wood, stone, concrete, and the like. In most of the previously proposed methods for adhering rubber it was necessary that the rubber be in an unvulcanized condition in order to get good adhesion. This unvulcanized rubber was then vulcanized in the bonding operation. By the method of the present invention, however, the rubber to be adhered is vulcanized prior to the time that it is to be adhered. This is a distinct advantage as the rubber is vulcanized in the desired size and shape at the factory and then can be either stored for long periods of time or transported over great distances without the rubber altering its size or shape. As is well known, unvulcanized rubber is quite easily distorted, and even torn, if not carefully handled. It is also somewhat heat plastic and at high temperatures softens and flows when under stress. Due to the fact that the rubber of the present invention has been vulcanized before it is to be adhered, this vulcanized rubber is capable of resisting rough handling that would completely ruin sheets of unvulcanized rubber.

By the method of this invention previously vulcanized rubber is adhered to base members by halogenating the surface of the vulcanized rubber, coating the halogenated surface with a layer of chlorinated rubber, coating this layer with a layer of a synthetic rubber, coating the synthetic rubber with another layer of chlorinated rubber, and pressing the chlorinated rubber surface into intimate contact with the base member. The synthetic rubber used in this invention is a synthetic rubber of the class consisting of polymers of substituted butadienes-1,3 monomers where the substituent is a member of the class consisting of chlorine and cyano groups and copolymers of any of the butadienes-1,3 monomers with other ethylenic monomers, at least one of said copolymerized monomers, either the butadienes-1,3 or the ethylenic monomer, containing a member of the class consisting of chlorine and cyano groups. These synthetic rubbers per se are well known by those skilled in the art.

The composite structure described in the preceding paragraph provides a bond in which the rubber is more tenaciously adhered than if the synthetic rubber layer were not present. By the method of this invention it is not necessary to use any pressure other than that required to obtain intimate contact between the adjacent layers of the composite structure although greater pressures are not prohibited. The adhesion is complete when the synthetic rubber layer has become vulcanized and this vulcanization may be obtained at ordinary room temperature by the proper choice of vulcanization accelerators. If desired, of course, it is possible to use both heat and pressure but it is not required for the proper working of this invention.

The synthetic rubbers used in this invention may be polymers of substituted butadienes-1,3, which include butadiene-1,3 or its homologs such as isoprene and 2,3-dimethyl butadiene, where the substituents are either chlorine or cyano groups, or the synthetic rubbers may be rubbery copolymers of various of the butadienes-1,3 with other ethylenic monomers, and in this case either the butadienes or the ethylenic monomer or both the butadienes and the ethylenic monomer must contain substituents of chlorine or cyano groups. The term rubbery copolymers means that the copolymer should contain at least 50% by weight of one of the butadienes-1,3. The compounds useful in this invention include polymers of 3-chloro butadiene-1,3, 3-bromo butadiene-1,3, 3-cyano butadiene-1,3, chloro isoprene, bromo isoprene, and cyano isoprene. They also include copolymers of butadiene-1,3 with acrylonitrile, methacrylonitrile, vinylidene chloride, n-chloro styrene, or methyl alpha chloro acrylate; copolymers of 3-chloro butadiene-1,2 with the above; copolymers of 3-cyano butadiene-1,3 with the above; copolymers of 2,3-dimethyl butadiene with the above; and copolymers of either butadiene-1,3, isoprene, or 2,3-dimethyl butadiene with either 3-chloro butadiene-1,3 or 3-cyano butadiene-1,3. There are many others of like nature that can also be used. Those compounds which are copolymerized with the butadienes are all ethylenic monomers and it is preferred that they contain a $CH_2=C<$ group. This is not absolutely necessary, however, as ethylenic monomers containing only one or more $>C=C<$ groups are also workable. All the synthetic rubbers used in this invention must be in an unvulcanized condition when the composite structure is built up and when vulcanization is complete the rubber will be found to be tenaciously adhered to the base member. This vulcanization may be obtained either at ordinary room temperature or at higher temperatures, depending upon the choice of vulcanization accelerators.

In the practice of this invention the surface of the vulcanized rubber, which may or may not contain pigments, fillers, softeners, and the like, is halogenated by any of several methods including exposing it to chlorine gas, preferably in the presence of a rubber solvent such as benzene. The rubber may also be halogenated by treating it with bromine, sulfur chloride, hydrogen chloride, or other halogenating substances.

The synthetic rubber and the chlorinated rubber for use in this invention may be applied in the form of sheets or they may be applied in the form of cements. The latter is the most desirable way. When used as a cement the halogenated surface of the vulcanized rubber to be bonded is coated with a layer of chlorinated rubber cement, then this is coated with a layer of the synthetic rubber cement. This synthetic rubber coating is next covered with chlorinated rubber cement, a second coating of chlorinated rubber cement is applied over the surface of the base member, and the two chlorinated rubber layers are pressed into intimate contact. Upon vulcanization of the synthetic rubber there is produced a tenacious and long-lasting bond. Although primarily useful in bonding pre-vulcanized rubber to base members as hereinabove indicated, the invention is not wholly limited to such procedure and, in some instances, an unvulcanized but vulcanizable rubber composition may be used in place of the pre-vulcanized rubber and then vulcanized at the same time as the synthetic rubber layer and either in heat or at ordinary room temperatures as described. This alternative procedure is somewhat less advantageous, however, and it is therefore generally preferred to utilize pre-vulcanized rubber.

The chlorinated rubber to be used in this invention may have any desired degree of chlorination. The ordinary chlorinated rubber usually contains from about 10% to about 75% chlorine by weight of the rubber. As a usual matter it will be found most desirable in this invention to use chlorinated rubber of about 65-67% chlorination.

The two figures of the accompanying drawing illustrate, respectively, typical structures produced in the manners described in the two specific examples which follow, the drawings being more or less diagrammatic in character and the intermediate layers, particularly, being shown in exaggerated thickness for clarity of illustration.

Example I

A block of vulcanized rubber is provided for adhering to a steel plate. One surface of this steel plate is cleansed as by sand-blasting. A surface of the rubber is halogenated by exposing it to an atmosphere of chlorine gas containing a small amount of benzene vapor for a period of about 12 hours. The halogenated rubber surface is then coated with a 40% solution, by weight, of chlorinated rubber of 67% chlorination dissolved in benzol. The solvent is permitted to evaporate and this chlorinated rubber layer is coated with a cement containing a composition comprising a copolymer of 55 parts by weight of butadiene-1,3 and 45 parts acrylonitrile dissolved in ethylene dichloride. The rubbery copolymer composition has the following ingredients:

| | Parts by weight |
|---|---|
| The copolymer | 100 |
| Carbon black | 50 |
| Zinc oxide | 5 |
| Lauric acid | 1 |
| Dibutyl phthalate | 50 |
| Sulfur | 2 |
| Benzo thiazyl disulfide | 2 |
| | 210 |

The solvent is permitted to evaporate and this layer and the cleaned steel surface are each coated with a 40% solution, by weight, of chlorinated rubber of 67% chlorination dissolved in benzol. The solvent is permitted to evaporate and the two chlorinated rubber surfaces are pressed into intimate contact. The entire assembly is placed under pressure and heated at 300° F. for 25 minutes in order to vulcanize the synthetic rubber layer. At the end of this time the rubber will be tenaciously bonded to the metal.

Example II

A block of vulcanized rubber is provided for adhering to a smooth glass surface. The glass is cleaned by washing it first with a water solution of trisodium phosphate and then with alcohol. A surface of the rubber is halogenated by exposing it to an atmosphere of bromine gas containing a small amount of gasoline vapor for a period of about 10 hours. The halogenated rubber surface is then coated with a 30% solution, by weight, of chlorinated rubber of 67% chlorination dissolved in chlorotoluene. The solvent is permitted to evaporate and the chlorinated rubber layer is coated with a cement containing neoprene (polychloroprene) composition dissolved in butyl acetate. The neoprene composition contains the following ingredients:

| | Parts by weight |
|---|---|
| Neoprene | 100 |
| Zinc oxide | 100 |
| Rosin | 20 |
| | 220 |

The solvent is permitted to evaporate and this layer and the clean glass surface are each coated with a 30% solution, by weight, of chlorinated rubber of 67% chlorination dissolved in chlorotoluene. The solvent is permitted to evaporate and the two chlorinated rubber surfaces are pressed into intimate contact. After a few days at room temperature the neoprene will be vulcanized and adhesion is complete.

It is possible in this invention to obtain good adhesion of rubber to a base member by omitting the chlorinated rubber layer that is normally applied between the halogenated rubber surface and the synthetic rubber layer. This omission is permitted if the synthetic rubber layer is applied to the halogenated rubber surface as soon as halogenation is complete and before the halogenated surface loses its tackiness. As this loss of tackiness ordinarily occurs in a very short time it is much preferred, as a practical matter, that the chlorinated rubber layer between the halogenated surface and the synthetic rubber layer be not omitted but included as set out in the examples given above.

In making up the preferred cements of this invention there are a large number of solvents that may be used. These include benzene, toluene, chlorobenzene, chlorotoluene, methyl ethyl ketone, acetone, butyl acetate, ethyl acetate, xylol, and the like, or mixtures of these or other similar solvents.

Having described my invention together with examples of materials to be used and specific procedures for practicing the invention, it is my desire that the invention be not limited by any of these but rather construed broadly within the spirit and scope of the invention as set out in the appended claims.

I claim:

1. In a method of adhering rubber to a base member, the method which comprises halogenating a surface of the rubber, and arranging intervening bonding layers contiguous to the halogenated surface of the rubber and to the base member, said bonding layers including a layer of chlorinated rubber contiguous to the base member, and a layer contiguous to the said chlorinated rubber layer and comprising an unvulcanized but vulcanizable synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, and thereafter completing the adhesion by vulcanizing the synthetic rubber in the absence of high temperatures and pressures.

2. In a method of adhering rubber to a base member, the method which comprises halogenating a surface of the rubber, applying to this halogenated surface a layer of chlorinated rubber, applying to this chlorinated rubber layer a layer comprising an unvulcanized but vulcanizable synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, applying to this synthetic rubber layer a layer of chlorinated rubber, assembling the above structure with the chlorinated rubber in contacting relationship with a base member, and vulcanizing the synthetic rubber in the absence of high temperatures and pressures.

3. In a method of adhering rubber to a base member, the method which comprises halogenating a surface of the rubber, applying to this halogenated surface a layer of chlorinated rubber, applying to this chlorinated rubber layer a layer comprising an unvulcanized but vulcanizable synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, applying to this synthetic rubber layer a layer of chlorinated rubber, applying to the surface of a base member a second layer of chlorinated rubber, assembling the structure with the two chlorinated rubber layers in intimate contact, and vulcanizing the synthetic rubber in the absence of high temperatures and pressures.

4. In a method of adhering rubber to a base member, the method which comprises halogenating a surface of the rubber, applying to this halogenated surface a layer of chlorinated rubber cement, applying to this chlorinated rubber layer a layer of cement comprising an unvulcanized but vulcanizable synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, applying to this synthetic rubber layer a layer of chlorinated rubber cement, applying a second layer of chlorinated rubber cement to the surface of the base member, assembling the structure with the two chlorinated rubber layers in intimate contact, and vulcanizing the synthetic rubber in the absence of high temperatures and pressures.

5. In a method of adhering rubber to a base member, the method which comprises halogenating a surface of the rubber by exposing it to chlorine gas, applying to this halogenated surface a layer of chlorinated rubber cement, applying to this chlorinated rubber layer a layer of cement comprising an unvulcanized but vulcanizable synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, applying to this synthetic rubber layer a layer of chlorinated rubber cement, applying a second layer of chlorinated rubber cement to a surface of the base member, assembling the structure with the two chlorinated rubber layers in intimate contact, and vulcanizing the synthetic rubber in the absence of high temperatures and pressures.

6. In a method of adhering rubber to a base member, the method which comprises halogenating a surface of the rubber, applying to this halogenated surface a layer of chlorinated rubber cement, applying to this chlorinated rubber layer a layer of cement comprising a rubbery copolymer of butadiene-1,3 and acrylonitrile, applying to this copolymer layer a layer of chlorinated rubber cement, applying a second layer of chlorinated rubber cement to the base member, assembling the structure with the two chlorinated rubber layers in intimate contact, and vulcanizing the rubbery copolymer in the absence of high temperatures and pressures.

7. In a method of adhering rubber to a base member, the method which comprises halogenating a surface of the rubber by exposing it to chlorine gas, applying to this halogenated surface a layer of chlorinated rubber cement, applying to this chlorinated rubber layer a layer of cement comprising a rubbery copolymer containing 55 parts by weight of butadiene-1,3 and 45 parts of acrylonitrile, applying to this copolymer layer a layer of chlorinated rubber cement, applying a second layer of chlorinated rubber cement to a surface of the base member, assembling the structure with the two chlorinated rubber layers in intimate contact, and vulcanizing the rubbery copolymer in the absence of high temperatures and pressures.

8. In a method of adhering rubber to a base member, the method which comprises halogenating a surface of the rubber, applying to this halogenated surface a layer of chlorinated rubber cement, applying to this chlorinated rubber layer a layer of cement comprising neoprene, applying to this neoprene layer a layer of chlorinated rubber cement, applying a second layer of chlorinated rubber cement to the surface of the base member, assembling the structure with the two chlorinated rubber layers in intimate contact, and vulcanizing the neoprene in the absence of high temperatures and pressures.

9. A composite product comprising vulcanized rubber with a halogenated surface, a layer of chlorinated rubber adhered to this halogenated surface, a layer adhered to this chlorinated rubber layer and comprising a synthetic rubber of the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, a layer of chlorinated rubber adhered to this synthetic rubber layer, and a base member adhered to the chlorinated rubber layer.

10. A composite product comprising vulcanized rubber with a chlorinated surface, a layer of chlorinated rubber adhered to this chlorinated surface, a layer adhered to this chlorinated rubber layer and comprising a synthetic rubber of the class consisting of polymers of substituted butadienes-1,3 monomers where the substituent is a member of the class consisting of chlorine and cyano groups, and copolymers of butadiene-1,3 monomers with other ethylenic monomers, with at least one of said copolymerized monomers containing a member of the class consisting of chlorine and cyano groups, a layer of chlorinated rubber adhered to this synthetic rubber layer, and a base member adhered to the chlorinated rubber layer.

11. A composite product comprising vulcanized rubber with a halogenated surface, a layer of chlorinated rubber adhered to the halogenated surface, a layer comprising a rubbery copolymer of butadiene-1,3 and acrylonitrile adhered to this chlorinated rubber layer, a layer of chlorinated rubber adhered to this copolymer layer, and a base member adhered to the chlorinated rubber layer.

12. A composite product comprising vulcanized rubber with a chlorinated surface, a layer of chlorinated rubber adhered to the chlorinated surface, a layer comprising a copolymer containing 55 parts by weight of butadiene-1,3 and 45 parts by weight of acrylonitrile adhered to this chlorinated rubber layer, a layer of chlorinated rubber adhered to this copolymer layer, and a base member adhered to the chlorinated rubber layer.

13. A composite product comprising vulcanized rubber with a halogenated surface, a layer of chlorinated rubber adhered to the halogenated surface, a layer comprising neoprene adhered to this halogenated rubber layer, a layer of chlorinated rubber adhered to this neoprene layer, and a base member adhered to the chlorinated rubber layer.

14. The method of making a composite product comprising vulcanized rubber adhered to a base member without the necessity of subjecting the assembly to the high temperatures and pressures customarily employed, which comprises providing the rubber in a vulcanized condition, halogenating a surface of the vulcanized rubber, assembling the rubber and the base in superposed relation with interposed bonding layers including a film of chlorinated rubber in contact with the halogenated surface of the rubber, a film of chlorinated rubber in contact with the base, and a film of synthetic rubber between the two chlorinated rubber films and in contact with both, said synthetic rubber being selected from the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, and subjecting the assembly only to such slight pressure as is required to secure intimate contact between the layers, said slight pressure being applied at a temperature not substantially above ordinary room temperatures.

BENJAMIN S. GARVEY.

REFERENCES CITED

The following references are of record in the file of this patent:

UNITED STATES PATENTS

| Number | Name | Date |
|---|---|---|
| 2,078,910 | Merrill | Apr. 27, 1937 |
| 2,147,620 | Winkelmann | Feb. 14, 1939 |
| 2,323,562 | Nugent | July 6, 1943 |

FOREIGN PATENTS

| Number | Country | Date |
|---|---|---|
| 493,139 | British | Oct. 3, 1938 |
| 481,396 | British | Mar. 10, 1938 |

---

Certificate of Correction

Patent No. 2,418,025. March 25, 1947.

BENJAMIN S. GARVEY

It is hereby certified that error appears in the printed specification of the above numbered patent requiring correction as follows: Column 2, line 28, for "butadiene-1,2" read *butadiene-1,3*; and that the said Letters Patent should be read with this correction therein that the same may conform to the record of the case in the Patent Office.

Signed and sealed this 5th day of August, A. D. 1947.

[SEAL]

LESLIE FRAZER,
*First Assistant Commissioner of Patents.* is a member of the class consisting of chlorine and cyano groups, and copolymers of butadienes-1,3 monomers with other ethylenic monomers, with at least one of said copolymerized monomers containing a member of the class consisting of chlorine and cyano groups, a layer of chlorinated rubber adhered to this synthetic rubber layer, and a base member adhered to the chlorinated rubber layer.

10. A composite product comprising vulcanized rubber with a chlorinated surface, a layer of chlorinated rubber adhered to this chlorinated surface, a layer adhered to this chlorinated rubber layer and comprising a synthetic rubber of the class consisting of polymers of substituted butadienes-1,3 monomers where the substituent is a member of the class consisting of chlorine and cyano groups, and copolymers of butadiene-1,3 monomers with other ethylenic monomers, with at least one of said copolymerized monomers containing a member of the class consisting of chlorine and cyano groups, a layer of chlorinated rubber adhered to this synthetic rubber layer, and a base member adhered to the chlorinated rubber layer.

11. A composite product comprising vulcanized rubber with a halogenated surface, a layer of chlorinated rubber adhered to the halogenated surface, a layer comprising a rubbery copolymer of butadiene-1,3 and acrylonitrile adhered to this chlorinated rubber layer, a layer of chlorinated rubber adhered to this copolymer layer, and a base member adhered to the chlorinated rubber layer.

12. A composite product comprising vulcanized rubber with a chlorinated surface, a layer of chlorinated rubber adhered to the chlorinated surface, a layer comprising a copolymer containing 55 parts by weight of butadiene-1,3 and 45 parts by weight of acrylonitrile adhered to this chlorinated rubber layer, a layer of chlorinated rubber adhered to this copolymer layer, and a base member adhered to the chlorinated rubber layer.

13. A composite product comprising vulcanized rubber with a halogenated surface, a layer of chlorinated rubber adhered to the halogenated surface, a layer comprising neoprene adhered to this halogenated rubber layer, a layer of chlorinated rubber adhered to this neoprene layer, and a base member adhered to the chlorinated rubber layer.

14. The method of making a composite product comprising vulcanized rubber adhered to a base member without the necessity of subjecting the assembly to the high temperatures and pressures customarily employed, which comprises providing the rubber in a vulcanized condition, halogenating a surface of the vulcanized rubber, assembling the rubber and the base in superposed relation with interposed bonding layers including a film of chlorinated rubber in contact with the halogenated surface of the rubber, a film of chlorinated rubber in contact with the base, and a film of synthetic rubber between the two chlorinated rubber films and in contact with both, said synthetic rubber being selected from the class consisting of polymers of substituted butadienes-1,3 monomers where the substituent is a member of the class consisting of chlorine and cyano groups, and copolymers of butadienes-1,3 monomers with other ethylenic monomers, with at least one of said copolymerized monomers containing a member of the class consisting of chlorine and cyano groups, and subjecting the assembly only to such slight pressure as is required to secure intimate contact between the layers, said slight pressure being applied at a temperature not substantially above ordinary room temperatures.

BENJAMIN S. GARVEY.

REFERENCES CITED

The following references are of record in the file of this patent:

UNITED STATES PATENTS

| Number | Name | Date |
|---|---|---|
| 2,078,910 | Merrill | Apr. 27, 1937 |
| 2,147,620 | Winkelmann | Feb. 14, 1939 |
| 2,323,562 | Nugent | July 6, 1943 |

FOREIGN PATENTS

| Number | Country | Date |
|---|---|---|
| 493,139 | British | Oct. 3, 1938 |
| 481,396 | British | Mar. 10, 1938 |

---

Certificate of Correction

Patent No. 2,418,025.                                                                                           March 25, 1947.

BENJAMIN S. GARVEY

It is hereby certified that error appears in the printed specification of the above numbered patent requiring correction as follows: Column 2, line 28, for "butadiene-1,2" read *butadiene-1,3*; and that the said Letters Patent should be read with this correction therein that the same may conform to the record of the case in the Patent Office.

Signed and sealed this 5th day of August, A. D. 1947.

[SEAL]

LESLIE FRAZER,
*First Assistant Commissioner of Patents.*